(12) United States Patent
Blumberg

(10) Patent No.: US 7,619,808 B2
(45) Date of Patent: Nov. 17, 2009

(54) LIGHT WAVE FRONT CONSTRUCTION

(75) Inventor: Girsh Blumberg, New Providence, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 300 days.

(21) Appl. No.: 11/448,390

(22) Filed: Jun. 6, 2006

(65) Prior Publication Data

US 2007/0279731 A1    Dec. 6, 2007

(51) Int. Cl.
G02B 26/00   (2006.01)
G02F 1/01    (2006.01)

(52) U.S. Cl. ............... 359/291; 359/290; 359/279; 359/35; 250/492.2; 250/458.1; 356/3

(58) Field of Classification Search ......... 356/445–448, 356/3, 72–73; 250/492.2, 492.3, 458.1, 459.1; 359/290–292, 223–224, 279, 237–238, 35, 359/21, 9, 1
See application file for complete search history.

(56) References Cited

U.S. PATENT DOCUMENTS

| | | | |
|---|---|---|---|
| 4,834,476 A | 5/1989 | Benton et al. | 350/3.76 |
| 4,944,580 A | 7/1990 | MacDonald et al. | 350/611 |
| 4,986,619 A | 1/1991 | Walker et al. | 350/3.61 |
| 5,015,080 A | 5/1991 | Cassarly et al. | 350/484 |
| 5,172,251 A | 12/1992 | Benton et al. | 359/9 |
| 5,828,485 A * | 10/1998 | Hewlett | 359/291 |
| 6,060,224 A * | 5/2000 | Sweatt et al. | 430/395 |
| 6,204,946 B1 | 3/2001 | Aksyuk et al. | 359/131 |
| 6,211,848 B1 | 4/2001 | Plesniak et al. | 345/1 |
| 6,288,821 B1 | 9/2001 | Aksyuk et al. | 359/245 |
| 6,566,627 B2 * | 5/2003 | Brandinger et al. | 219/121.69 |
| 6,646,773 B2 * | 11/2003 | Garner | 359/35 |
| 6,690,885 B1 | 2/2004 | Aksyuk et al. | 398/45 |
| 6,713,754 B1 * | 3/2004 | Mueller | 250/226 |

(Continued)

FOREIGN PATENT DOCUMENTS

EP    1 465 126 A2    10/2004

(Continued)

OTHER PUBLICATIONS

Lucente, Mark, "Diffraction-Specific Fringe Computation for Electro-Holography," Ph.D Thesis, Dept. of Electrical Engineering and Computer Science, Massachusetts Institute of Technology available online at http://www.media.mit.edu/spi/HVmark1.htm, Sep. 1994, abstract, table of contents, and pp. 13-176.

(Continued)

*Primary Examiner*—Sang Nguyen
(74) *Attorney, Agent, or Firm*—John F. McCabe

(57) ABSTRACT

A method for producing a 3D image includes providing a pixel-by-pixel map over a preselected aperture of relative phases for coherent light scattered by or transmitted through a desired scene. The method includes positioning micro-mirrors of a reconfigurable mirror array to produce reflected light whose wave front has the pixel-by-pixel map over the preselected aperture in response to the array being illuminated with a coherent light beam. The method includes illuminating the reconfigurable mirror array with the coherent light beam to enable producing a 3D image of the desired scene.

16 Claims, 7 Drawing Sheets

U.S. PATENT DOCUMENTS

| | | | |
|---|---|---|---|
| 6,788,416 B2 * | 9/2004 | Reuter | 356/445 |
| 6,819,469 B1 | 11/2004 | Koba | 359/290 |
| 6,879,391 B1 * | 4/2005 | Danko | 356/237.4 |
| 6,956,687 B2 * | 10/2005 | Moon et al. | 359/223 |
| 7,019,883 B2 * | 3/2006 | Moon et al. | 359/290 |
| 7,154,660 B2 * | 12/2006 | Reuter | 359/291 |
| 7,301,688 B2 * | 11/2007 | Shreeve et al. | 359/290 |
| 7,345,806 B2 * | 3/2008 | Simonian et al. | 359/291 |
| 7,440,158 B2 * | 10/2008 | Giles et al. | 359/279 |
| 2005/0134956 A1 | 6/2005 | Mangrum et al. | 359/291 |
| 2005/0219675 A1 | 10/2005 | Aksyuk et al. | 359/224 |
| 2005/0286101 A1 * | 12/2005 | Garner et al. | 359/9 |

FOREIGN PATENT DOCUMENTS

| | | |
|---|---|---|
| EP | 1 465 126 A3 | 10/2004 |
| WO | WO02/48797 A2 | 6/2002 |
| WO | WO02/48797 A3 | 6/2002 |
| WO | WO02/095503 A1 | 11/2002 |

OTHER PUBLICATIONS

PCT International Search Report dated Feb. 21, 2008 (PCT/US2007/012038) 4 pages.

U.S. Appl. No. 11/009,447, filed Dec. 10, 2004, Aksyuk et al.

U.S. Appl. No. 11/140,313, filed May 27, 2005, Aksyuk et al.

* cited by examiner

LIGHT WAVE FRONT CONSTRUCTION

BACKGROUND

1. Technical Field

The invention relates to apparatus and methods for constructing three-dimensional images.

2. Discussion of the Related Art

This section introduces aspects that may be helpful to facilitating a better understanding of the inventions. Accordingly, the statements of this section are to be read in this light. The statements of this section are not to be understood as admissions about what is in the prior art or what is not in the prior art.

One way to form a three-dimensional (3D) image involves using a hologram. In one form, a hologram is a permanent optical recording medium whose local transmissivity records relative amplitude and phase information from a wave front of a coherent light beam that has been scattered by the 3D scene being imaged. The permanent optical recording medium may be produced by developing a photographic medium that has been exposed to a light interference pattern. The light interference pattern is made, e.g., by interfering a coherent light beam scattered by the 3D scene with a coherent reference light beam.

To produce the 3D image, the hologram is re-illuminated with an appropriate coherent light beam. The re-illuminated hologram generates a first outgoing light beam that produces a 3D image of the scene used to make the hologram. The first outgoing light beam has a wave front on which the relative phases and relative amplitudes are substantially those of the light beam that was originally scattered by the scene during the production of the hologram. The illuminated hologram also generates a second outgoing light beam that produces a false 3D image of the scene that was used to make the hologram.

BRIEF SUMMARY

While a hologram may produce a 3D image, relying on a permanent optical recording medium to make 3D images is inconvenient. Herein, various embodiments produce 3D images by modulating coherent light beams with reconfigurable arrays rather than with permanent optical recording media. Thus, some such embodiments may produce a sequence of substantially different 3D images.

A first aspect features a method for producing a 3D image. The method includes providing a pixel-by-pixel map over a preselected aperture of relative phases of coherent light scattered by or transmitted through a desired scene. The method includes positioning micro-mirrors of a reconfigurable mirror array to produce reflected light whose wave front has the pixel-by-pixel map over the preselected aperture in response to the array being illuminated with a coherent light beam. The method also includes illuminating the reconfigurable mirror array with the coherent light beam to enable producing a 3D image of the desired scene.

A second aspect features an apparatus. The apparatus includes a source of coherent light having a selected wavelength and a reconfigurable mirror array located to be illuminated by the source. The array includes a plurality of movable micro-mirrors. The largest effective lateral linear dimension of each micro-mirror is smaller than ten times the wavelength.

BRIEF DESCRIPTION OF THE DRAWINGS

In the Figures and text, like reference numerals indicate elements with similar functions.

In the Figures, the relative dimensions of some features may be exaggerated to more clearly illustrate one or more of the structures therein.

Herein, various embodiments are described more fully by the Figures and the Detailed Description of Illustrative Embodiments. Nevertheless, the inventions may be embodied in various forms and are not limited to the embodiments described in the Figures and Detailed Description of Illustrative Embodiments.

DETAILED DESCRIPTION OF ILLUSTRATIVE EMBODIMENTS

A) Reconstructing 3D Images

Figure 1:
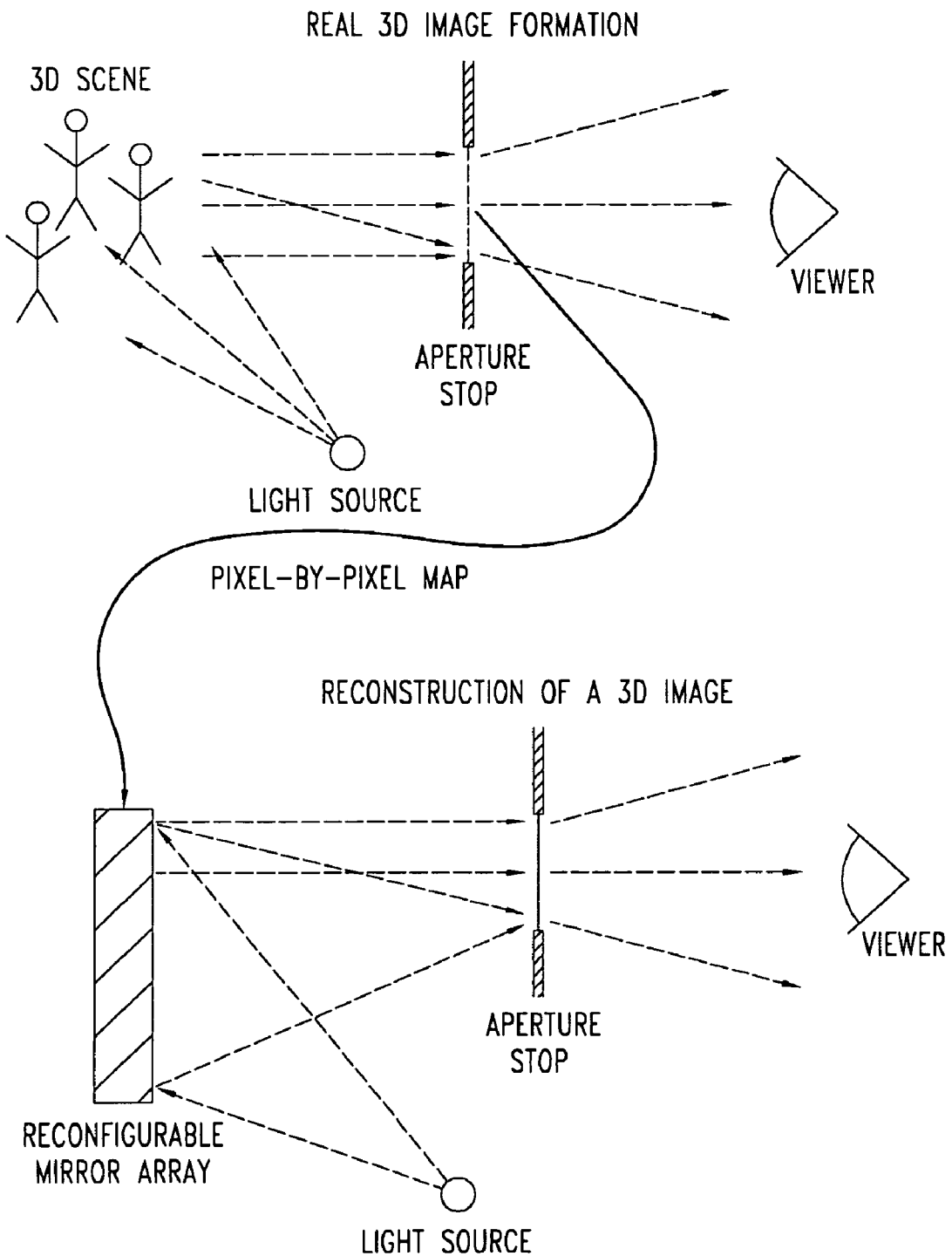
FIG. 1 schematically illustrates a way of reconstructing three-dimensional (3D) images.

FIG. 1 schematically illustrates a method for reconstructing a 3D image of a desired scene.

To form a real 3D image, a coherent light source may illuminate the desired scene with coherent light so that the desired scene scatters or transmits part of the illumination light thereby producing an outgoing coherent light beam. A part of the outgoing light beam passes through an original aperture, e.g., as defined by an aperture stop, and forms an image of the desired scene in the eye of a viewer located on the other side of the aperture. Over the original aperture, the pattern of relative phases and intensities of the outgoing coherent light beam determines the form of the light beam that will be seen by the viewer.

Over the aperture, it is possible to map the relative intensity and/or phase of the electric or magnetic field of the outgoing coherent light beam in a pixel-by-pixel manner. The availability of a pixel-by-pixel map of the relative phases over such an aperture or the availability of a pixel-by-pixel map of both the relative amplitudes and the relative phases over such an aperture is the basis of the method for reconstructing the 3D image.

To reconstruct the 3D image, a light source illuminates a reconfigurable mirror array with coherent light. Based on the form of the pixel-by-pixel map, the mirrors of the reconfigurable mirror array are positioned to reflect incident illumination light from a coherent light source in a manner that produces an outgoing coherent light beam with about the same map over a preselected aperture. That is, the outgoing coherent light beam has the same pixel-by-pixel map of relative phases or of both relative amplitudes and relative phases over a preselected aperture. The preselected aperture is, e.g., the original aperture or a portion of the original aperture. Since such a reconstructed light beam has about the same map as a coherent light beam actually scattered or transmitted by the desired scene, the reconstructed light beam will generate about the same 3D image in the eye of a viewer located to the right of the preselected aperture.

Since the above-described method uses a reconfigurable mirror array to construct the light beam that forms the final 3D image, the method may be adaptable to the construction of a temporal sequence of different 3D images. This contrasts with methods that use permanent holograms to form 3D images. In such holograms, the reliance on a permanent optical recording medium limits the ability to produce a temporal sequence of different 3D images.

Herein, a temporal sequence of images will be referred to as a video. Some embodiments of apparatus and methods are able to produce a temporal sequence of different 3D images. Indeed, some such embodiments may be able to produce video images at frequencies high enough to give humans the perception of 3D video, e.g., at frequencies higher than about 20 frames per second.

B) Apparatus for Image Construction

Figure 2A:
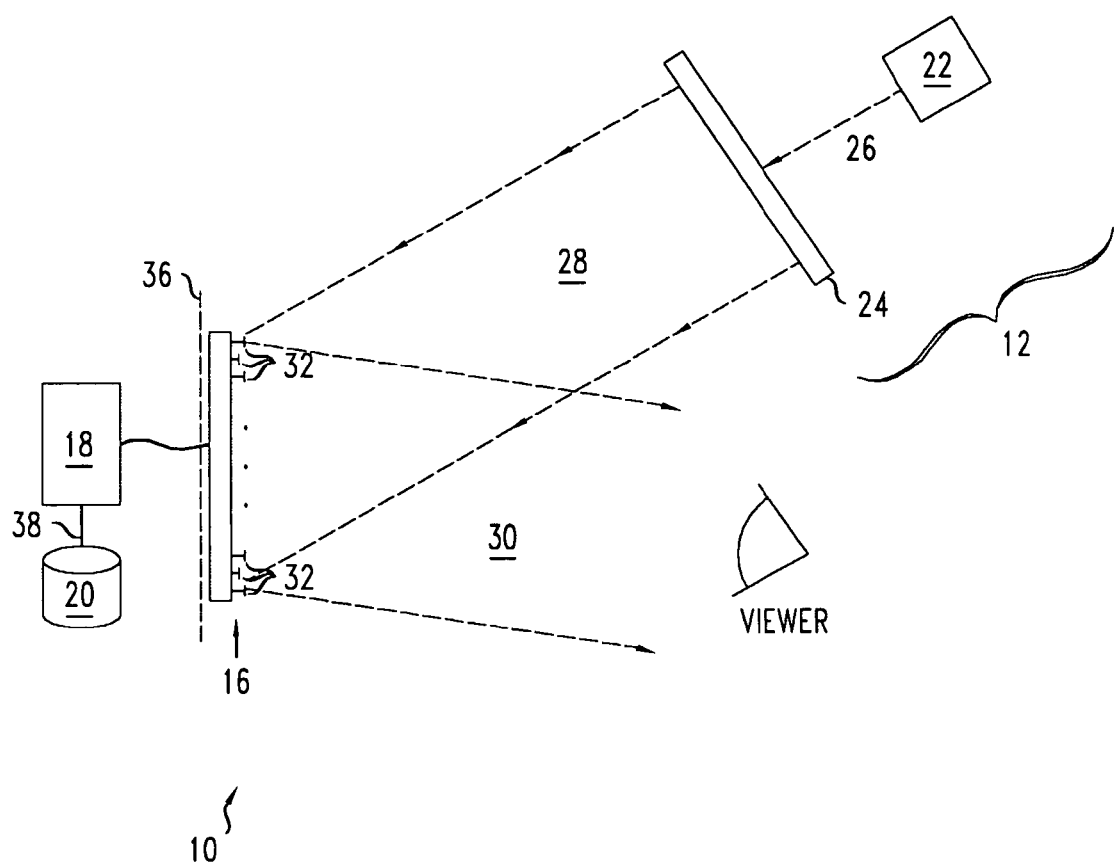
FIG. 2A is a block diagram of an apparatus that modulates a coherent light beam to produce 3D images, e.g., according to the method of FIG. 1.
Figure 2B:
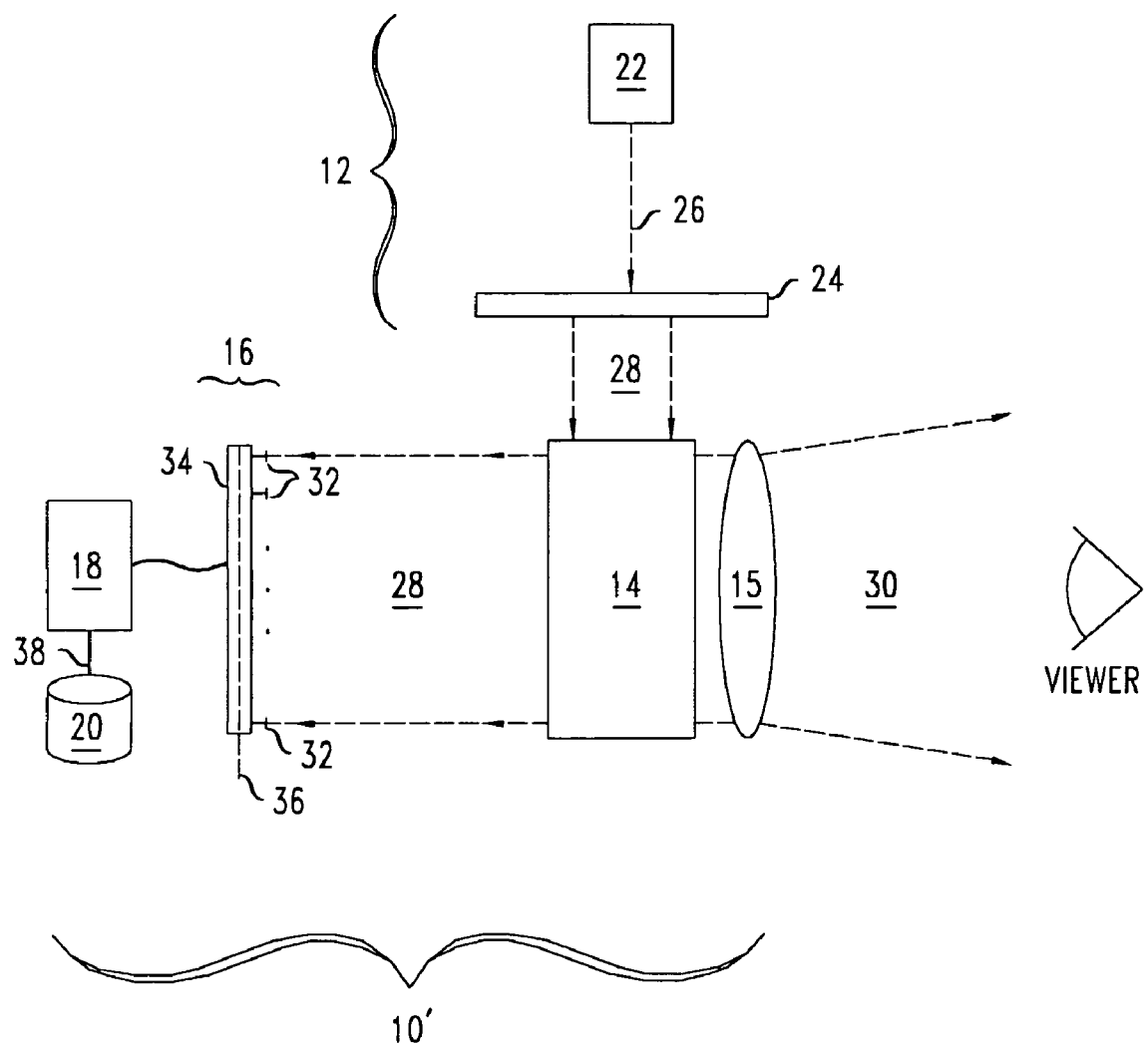
FIG. 2B is a block diagram of another apparatus that modulates a coherent light beam to produce 3D images, e.g., according to the method of FIG. 1.

FIGS. 2A and 2B show exemplary apparatus 10, 10' for reconstructing 3D images according to the method illustrated by FIG. 1. The apparatus 10, 10' include a coherent light source 12, a reconfigurable mirror array 16, a digital data processor 18, a digital data storage device 20, and optionally include an optical beam redirector 14 and/or a lens system 15.

The coherent light source 12 includes, e.g., a light source 22 and beam expansion optics 24. The light source 22 outputs a light beam 26 that is temporally coherent. Exemplary light sources 22 include, e.g., lasers that produce laser light at infrared or visible wavelengths. The beam expansion optics 24 produces a wide and spatially and temporally coherent light beam 28, e.g., a collimated light beam, from the light beam 26 output by the light source 22. Exemplary beam expansion optics 24 include refractive lenses or lens systems, and reflective optical systems. The beam expansion optics 24 either directs the wide light beam 28 obliquely towards the reconfigurable mirror array 16, e.g., as in FIG. 2A, or directs the wide light beam 28 towards an optical beam redirector 14, e.g., as shown in FIG. 2B. In either case, part or all of the wide light beam 28 illuminates the whole front surface of the reconfigurable mirror array 16.

The optical beam redirector 14 directs part of the wide light beam 28 towards the reconfigurable mirror array 16, e.g., so that said part of the wide light beam 28 is normally incident on the reconfigurable mirror array 16. The optical beam redirector 14 also transmits a part or all of the light reflected by the reconfigurable mirror array 16 thereby forming a viewing beam 30 that propagates into a range of viewing angles. Exemplary optical beam redirectors 14 include partially silvered mirrors, optical rotators, and polarization beam splitters.

Figure 3:
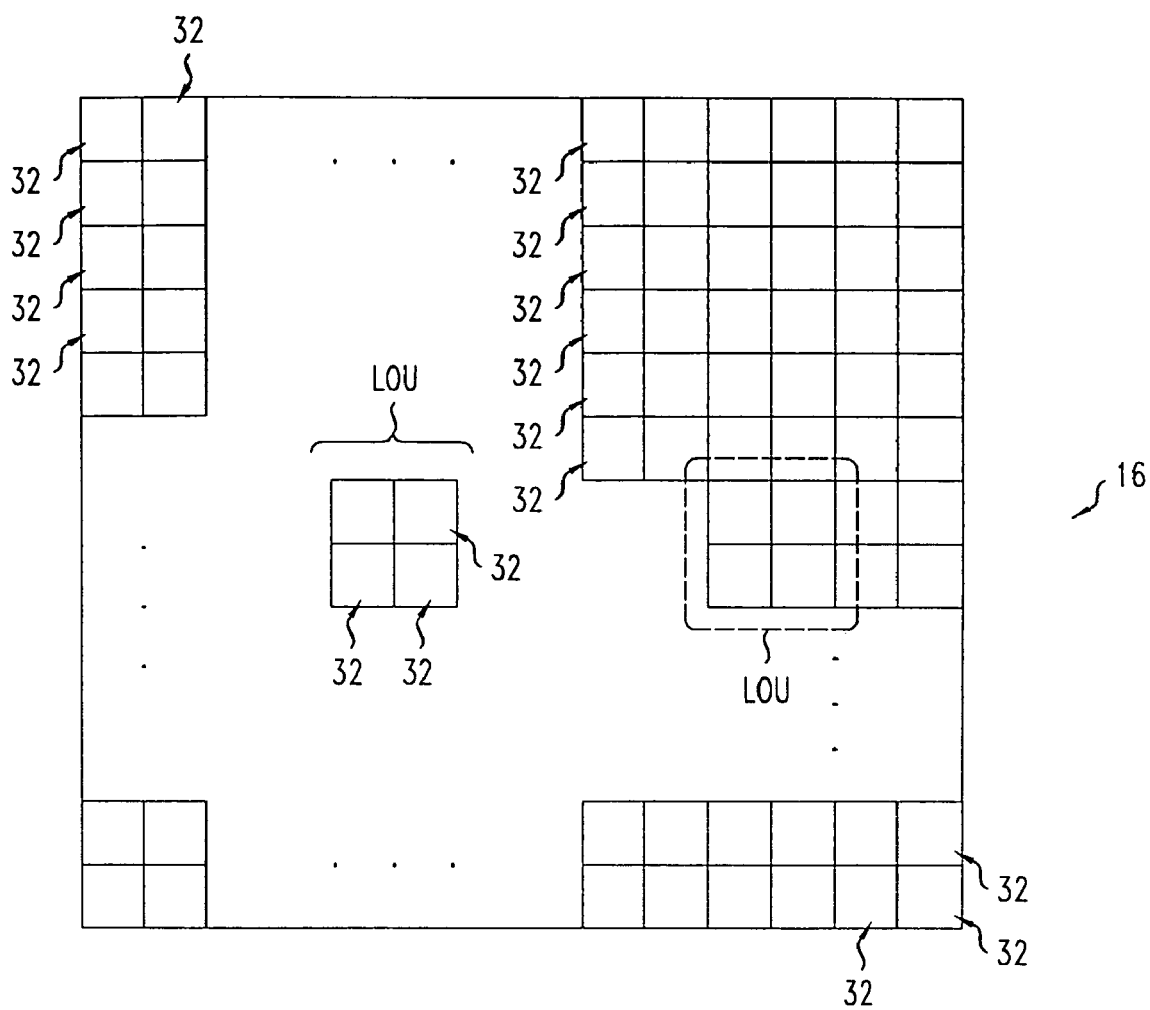
FIG. 3 is a schematic top view of an exemplary reconfigurable mirror array for the apparatus of FIGS. 2A and 2B.

The reconfigurable mirror array 16 includes a two-dimensional (2D) array of MEMS-actuated micro-mirrors 32. The micro-mirrors 32 may be circular, rectangular, triangular, square, or may even have a non-symmetric shape. The micro-mirrors 32 may be located at the vertices of a regular rectangular lattice, e.g., as shown in FIG. 3, may be located at the vertices of another regular 2D lattice, or may even be randomly distributed over a planar region. Each micro-mirror 32 is independently translatable normal to a reference plane 36, which is itself approximately parallel to the average surface of the reconfigurable mirror array 16.

Figure 4:
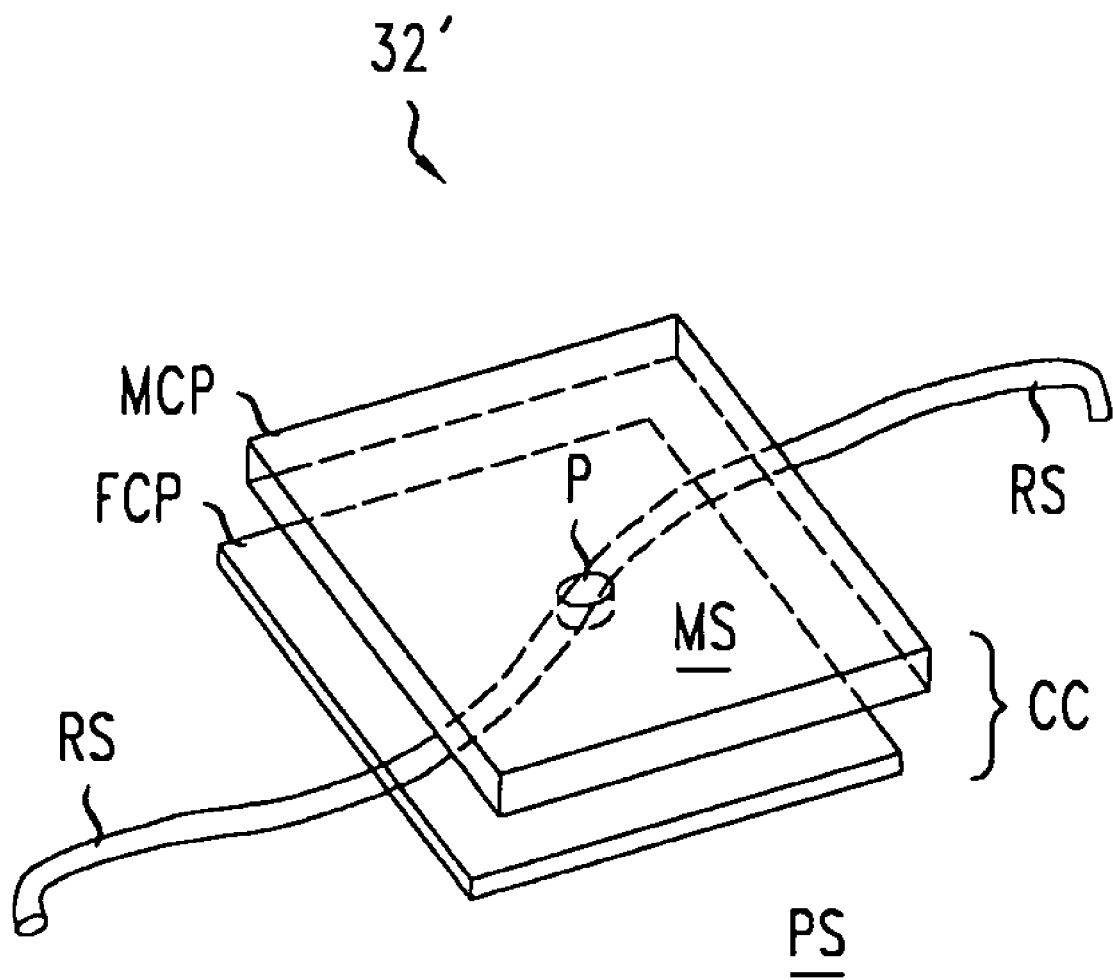
FIG. 4 is an oblique view of an exemplary micro-electrical mechanical system (MEMS)-actuated micro-mirror that can be used, e.g., in the apparatus of FIGS. 2A and 2B.

FIG. 4 shows one embodiment of a MEMS-actuated micro-mirror 32'. The micro-mirror 32' includes a control capacitor, CC, a restoring spring, RS, and a top planar mirror surface, MS, e.g., a silicon or metallic planar surface. The control capacitor, CC, includes a movable conducting plate, MCP, and a fixed conducting plate, FCP, i.e., a plate fixed to planar substrate, PS. The restoring spring RS rigidly fixes to the movable conductive plate, MCP, via a post, P, and provides a restoring force that returns the mirror surface, MS, to its initial position when the control capacitor CC is discharged. The movable conductive plate MCP translates the mirror surface, MS, perpendicular to the surface of the planar substrate, PS, responsive to control voltages applied across the facing conducting plates MCP, FCP.

Other exemplary MEMS-actuated micro-mirrors and/or 2D arrays thereof may be described, e.g., in one or more of U.S. patent application Ser. No. 11/009,447 filed Dec. 10, 2004 by Vladimir A. Aksyuk et al, U.S. patent application Ser. No. 10/813,951 filed Mar. 31, 2004 by Vladimir A. Aksyuk et al, and U.S. patent application Ser. No. 11/140,313 filed May 27, 2005 by Vladimir A. Aksyuk et al. These patent applications are incorporated herein by reference in their entirety. The reconfigurable mirror array 16 may include micro-mirrors and/or 2D arrays thereof as described in one or more of the above-incorporated patent applications.

The digital data processor 18 produces control signal sets that operate the MEMS-actuated micro-mirrors 32. The MEMS actuators readjust the distances of the individual micro-mirrors 32 from the reference plane 36 in a manner responsive to the form of control signal sets. The digital data processor 18 produces an appropriate control signal set for each received pixel-by-pixel map for the values of the fields of a light beam over the preselected aperture.

The digital data storage device 20 stores data sets that the data processor 18 uses to determine the control signal sets. The data sets may include, e.g., pixel-by-pixel maps of relative phases over the preselected aperture or pixel-by-pixel maps of relative amplitudes and relative phases over the preselected aperture. The data sets may also include control voltages for positioning the micro-mirrors 32 so as to produce from an illumination light a light beam with such a pixel-by-pixel map across the preselected aperture. The data sets are communicated to the digital data processor 18 via a communication line 38.

C) Field of View for Constructed 3D Image

In the apparatus 10, 10', the micro-mirrors 32 may have one or two small lateral linear dimensions so that the individual micro-mirrors 32 substantially diffract light having the wavelength, $\lambda$, that is output by the light source 12. Typically, one or both effective lateral linear dimensions of the individual micro-mirrors 32 are smaller than a preselected length that is equal to $10\lambda$, $5\lambda$, $2\lambda$, or $\lambda$. Exemplary lateral linear dimensions include diameters and the edge lengths of the micro-mirrors 32. Herein, an effective lateral linear dimension is the actual lateral linear dimension times any magnification that lateral linear dimensions of the reconfigurable mirror array 16 would have when viewed through the output optics of the apparatus 10, 10', e.g., viewed through the lens 15 of FIG. 2A.

Due to diffraction by the individual micro-mirrors 32, the reconfigurable mirror array 16 reflects incident coherent light of the wavelength, $\lambda$, into a range of viewing directions. For that reason, the viewing beam 30 sends light into a range of viewing directions. Over the range of viewing directions, a viewer may observe a 3D image reconstructed by the reconfigurable mirror array 16. Preferably, the range of viewing directions covers an angular range of at least 100 or even covers an angular range of 30° or more.

D) Method for Displaying 3D Images

Figure 5:
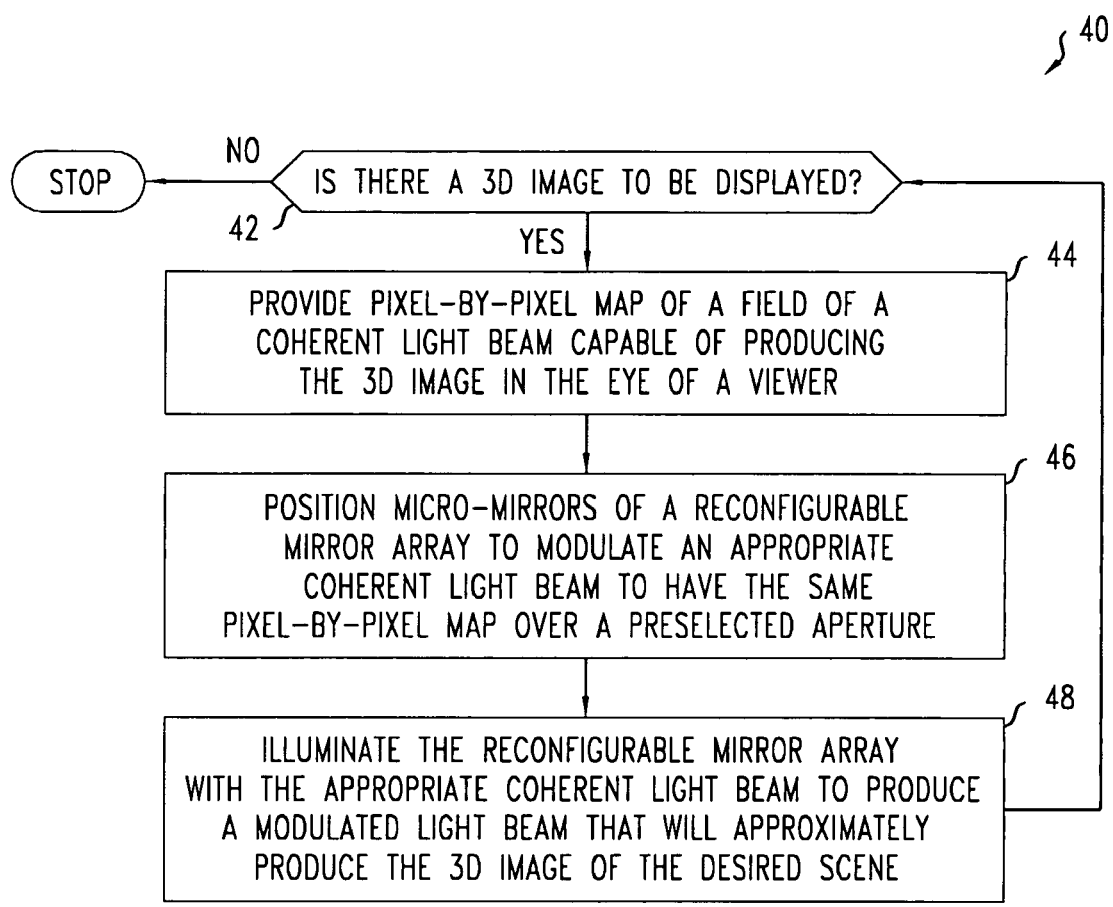
FIG. 5 is a flow chart illustrating a method for producing 3D images, e.g., according to the method of FIG. 1 and/or using the apparatus of FIGS. 2A and 2B.

FIG. 5 illustrates a method 40 for displaying 3D images of scenes, e.g., using the apparatus 10, 10' of FIGS. 2A and 2B. The method 40 involves approximately reconstructing wave fronts of coherent light beams that would have been scattered by the scenes or transmitted through the scenes. The wave fronts are reconstructed over a preselected aperture through which the coherent light beams would have passed in arriving to a viewer. The preselected aperture is a finite planar region whose form may vary in different embodiments.

The method 40 includes determining whether a 3D image of a desired scene remains to be displayed (step 42). The digital data processor 18 may perform such a determination step. If no such 3D images remain for displaying, the method 40 terminates.

If a 3D image remains, the method 40 includes providing a pixel-by-pixel map of the electric or magnetic field of a coherent light beam that is capable of producing the 3D image of the desired scene in the eye of a viewer (step 44). The coherent light beam may be formed of light scattered by or transmitted through the desired scene. The pixel-by-pixel map provides relative phases of the electric or magnetic field of the coherent light beam over a set of pixels that covers the preselected aperture. The pixel-by-pixel map may optionally also provide relative amplitudes of the electric or magnetic field of the wave front over the same set of pixels. Thus, the pixel-by-pixel map is a description of the wave front of the coherent light beam that is capable to producing a 3D image of the desired scene in the eye of a real viewer.

The pixel-by-pixel map is a list whose entries are in correspondence with the individual pixels of a pixel set that covers the preselected aperture. In the list, each entry provides the average relative phase and optionally the average relative amplitude of the electric or magnetic field of the coherent light beam over the corresponding pixel. The entire pixel-by-pixel map may be stored in a digital data storage device, e.g., the digital data storage device 20, or may be derived, e.g., by the digital data processor 18, from data for the 3D image that are themselves stored in the digital data storage device.

The method 40 includes positioning the micro-mirrors of the reconfigurable mirror array, e.g., the micro-mirrors 32, to reflect an appropriate coherent light beam in a manner that modulates that light beam to have the same pixel-by-pixel map over the preselected aperture (step 46). An appropriate coherent light beam is typically a plane wave with both lateral and longitudinal coherence, e.g., a light beam produced by the light source 12. The positioning step 44 varies, e.g., the distances of individual micro-mirrors 32 from the reference plane 36 so that the incident coherent light beam is modulated into an outgoing coherent light beam with the provided pixel-by-pixel map on the preselected aperture. At each pixel of the preselected aperture, the spatial average of the relative phase of the electric or magnetic field of the modulated coherent light beam will about that of a coherent light beam that was scattered by or transmitted through the desired scene. If relative amplitudes are also reconstructed, at each pixel, the spatial average of the relative amplitude of the electric or magnetic field of the modulated coherent light beam will also be that of a coherent light beam that was scattered or transmitted through the desired scene. There may be multiple sets of positions for the micro-mirrors 32 that will reconstruct such a coherent light beam scattered by or transmitted through the desired scene over the preselected aperture.

The positioning step 46 may reconstruct the coherent light beam scattered by or transmitted through the desired scene over a preselected aperture, wherein the preselected aperture is located just in front of the reconfigurable mirror array 16. For such a preselected aperture, one local operating unit (LOU) of the micro-mirrors 32, e.g., as shown in FIG. 3, reflects the incident coherent light into one pixel of the preselected aperture. For a normally incident illumination light beam, the pixel may be the part of the preselected aperture that is located just in front of the corresponding local operating unit. In such embodiments, the entry of the pixel-by-pixel map for a single pixel defines distances from the reference plane 36 of the micro-mirrors 32 of the corresponding local operating unit.

Alternately, the positioning step 46 may reconstruct the coherent light beam scattered by or transmitted through the desired scene over a preselected aperture that is located much farther from the reconfigurable mirror array 16. Then, the values of multiple entries of the pixel-by-pixel map will typically be needed to determine the distance of each micro-mirror 32 from the reference plane 36.

The method 40 includes then, illuminating the reconfigurable mirror array, with the appropriate coherent light beam to produce a modulated light beam that approximately produces the 3D image of the desired scene (step 48). Due to the positioning of the micro-mirrors at step 46, the modulated light beam will have at each pixel of the preselected aperture the average relative phase of a coherent light beam scattered by or transmitted through the desired scene. In embodiments that also reconstruct relative amplitudes, the modulated light beam will also have at each pixel of the preselected aperture the average relative amplitude of a coherent light beam scattered by or transmitted through the desired scene.

The 3D image may be reconstructed with visible or infrared light. To perform the reconstruction, the coherent light beam should be spatially coherent across the height and width of the reconfigurable mirror array and sufficiently temporally coherent to reproduce the depth of the desired scene.

To produce a significant field of view, the micro-mirrors of the reconfigurable mirror array, e.g., the array 16, may have effective lateral linear dimensions that are not too large with respect to the wavelength of the illumination light. As discussed above, the largest lateral linear dimension, diameter, or edge length(s) of said micro-mirrors may be equal to or smaller than a preselected length, wherein the preselected length is 10, 5, 2, or 1 times the wavelength of said illumination light.

The method 40 includes looping back (50) to repeat steps 42, 44, 46, and 48 and thus, may reconstruct a temporal sequence of 3D images of desired scenes. In some embodiments, the looping back may reconstruct new 3D images at a rate of at least twenty 3D images per second and preferably at a rate of thirty or more 3D frames per second. Thus, the frame rate for such reconstructed 3D images may be high enough to produce a human perception of real 3D video.

E) Exemplary Ways to Position Micro-Mirrors of the Mirror Array

As already described, the method 40 may operate the reconfigurable mirror array 16 of apparatus 10, 10' to set relative phases of reflected light over the pixels of the preselected aperture or to set effectively both relative amplitudes and relative phases of the reflected light over the preselected aperture.

As an example, ways are illustrated for setting such relative phases/amplitudes over the exemplary preselected aperture that is the planar surface located just in front of the reconfigurable mirror array 16.

In embodiments that only set the relative phases of such reflected light, the individual micro-mirrors 32 are separately translated with respect to the reference plane 36. For the exemplary preselected aperture and normally incident illumination light, the distance of each micro-mirror 32 from the reference plane 36 sets the relative phase of the reflected light on the pixel located in front of the micro-mirror 32. That is, said distance determines the optical path length traversed by light that is reflected from said micro-mirror 32 and thus, determines its relative phase at the corresponding pixel located in front of the micro-mirror 32.

In embodiments that set both relative amplitudes and relative phases, the micro-mirrors 32: are typically operated together in groups as local operating units (LOUs). Each local operating unit is a-group of neighboring micro-mirrors 32, e.g., 2, 3, 4, or more of the micro-mirrors 32. The distances of the micro-mirrors 32 of a single local operating unit from the reference plane 36 determine the average relative amplitude and average relative phase of the light reflected to the corresponding pixel of the above-described preselected aperture.

Figure 6:
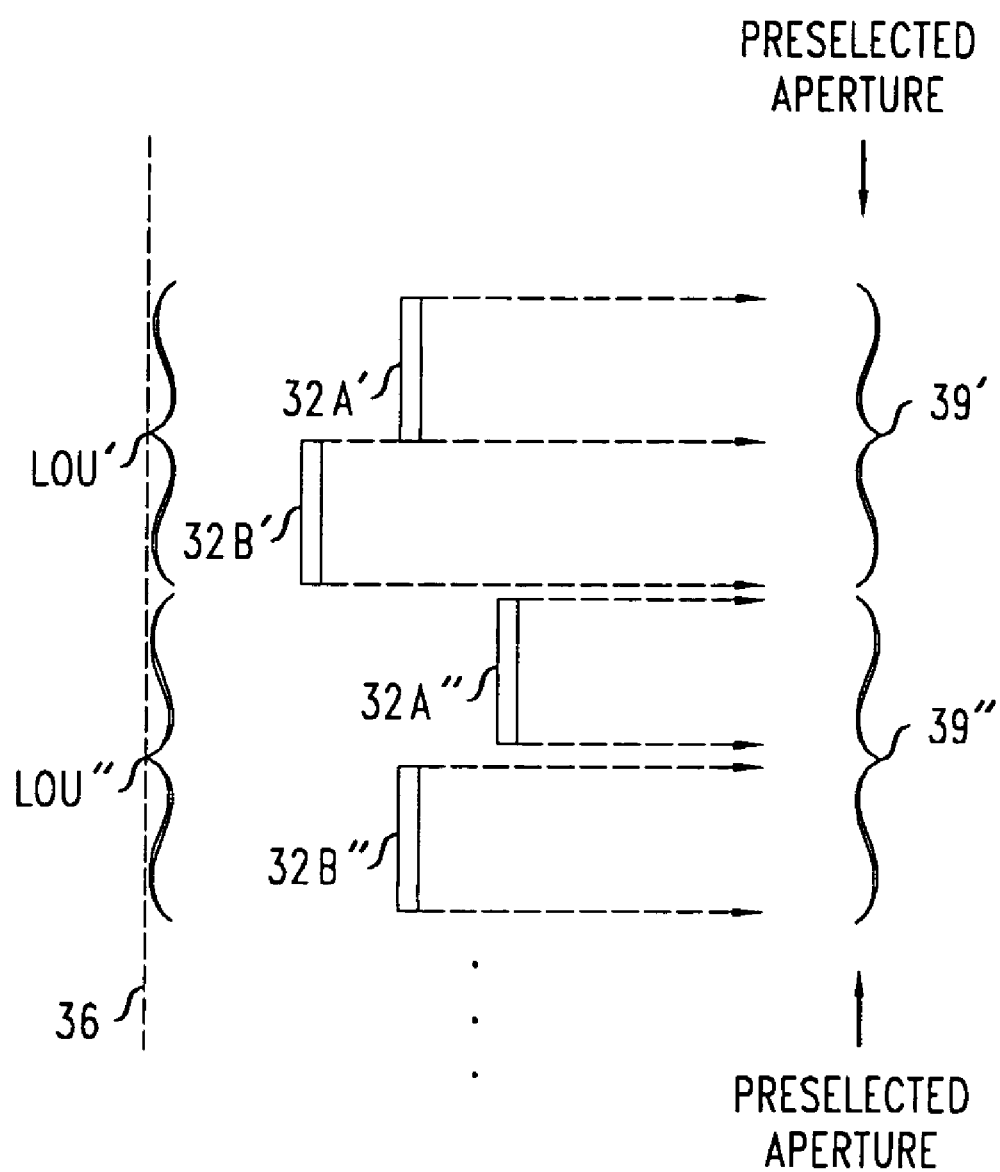
FIG. 6 is a schematic side view of a portion of the reconfigurable mirror array of FIGS. 2A, 2B, and 3, the view illustrates local operating units therein.

FIG. 6 illustrates operation of local operating units LOU' and LOU" with two micro-mirrors each, i.e., micro-mirrors 32A' and 32B' and micro-mirrors 32A" and 32B", respectively. With respect to relative amplitudes, differences between optical path lengths traversed by light reflected from the first micro-mirror 32A', 32A" and traversed by light reflecting from the second micro-mirror 32B', 32B" of the same local operating unit LOU', LOU" fix the average relative amplitudes of the light reflected to the corresponding pixels 39', 39". Optical path length differences of $N\lambda$ where N is an integer give maximal average amplitudes on the corresponding pixels 39', 39", i.e., with $\lambda$ being the light's wavelength. Optical path length differences of $(\lambda/2+N\lambda)$ give minimal average amplitudes on the corresponding pixels. Optical path length differences of $(x\lambda+N\lambda)$ where $0<x<\frac{1}{2}$ give average relative amplitudes on the corresponding pixels 39', 39" that interpolate between the maximum and minimum values. With respect to the relative phases, differences between the average optical path lengths traversed by light reflected from the micro-mirrors 32A', 32B' of the local operating unit LOU' and the average optical path lengths traversed by light reflected from the micro-mirrors 32A", 32B" of the local operating unit LOU" substantially determine the relative phase differences between the light reflected to the corresponding pixels 39', 39". Thus, the relative phase of the light that a local operating unit LOU', LOU" reflects to the corresponding pixel 39', 39" may be adjusted by simply translating the micro-mirrors {32A', 32B'}, {32A", 32B"} of the local operating units as groups, i.e., so as to not change the average relative amplitudes of said reflected light at the corresponding pixels 39', 39". Such group translations can reproduce any distribution of relative phases between light reflected to different ones of the pixels of the selected aperture.

F) Evaluating a Pixel-by-Pixel Map of a Wave Front Over an Aperture

Several techniques are available for constructing a pixel-by-pixel map over a preselected aperture of a coherent light beam that was scattered by or transmitted through a desired scene.

One technique for constructing such a pixel-by-pixel map involves first approximating the desired scene by a set of mutually coherent point light sources and then, calculating the pixel-by-pixel map of the electric or magnetic field of each of the point sources over the preselected aperture. This technique obtains the final pixel-by-pixel map of the light beam that was scattered by or transmitted through the desired scene by summing the electric or magnetic field of the individual point sources in a pixel-by-pixel manner. From the sums, approximate values of relative amplitudes and relative phases may be found for the desired coherent light beam at each pixel of the preselected aperture. This technique may be further improved by using transforms of the desired scene that advantageously incorporate symmetries therein, e.g., Fourier transforms for a periodic desired scene and Bessel transforms for cylindrically symmetric desired scenes.

Another technique for constructing the pixel-by-pixel map involves performing measurements on a coherent light beam that was actually scattered by or transmitted through the desired scene to obtain its pixel-by-pixel map over the selected aperture. The technique involves measuring the intensity of such a coherent light beam in a pixel-by-pixel manner over the preselected aperture. The pixel-by-pixel map of the intensity may be made, e.g., using a charge-coupled detector (CCD). Typically, directly measuring the pixel-by-pixel map of the phase of the coherent light beam over the preselected aperture is not available. For that reason, the technique includes performing a CCD measurement of the intensity of an interference pattern between the coherent light beam actually scattered by or transmitted through the desired scene and a mutually coherent reference light beam with known properties. The technique includes using the measured pixel-by-pixel maps for the intensity of the coherent light beam scattered by or transmitted through the desired scene and for the interference pattern as well as the known form of the reference light beam to extract a pixel-by-pixel map of the relative phases of the coherent light beam actually scattered by or transmitted through the desired scene. If the reference coherent light beam is much stronger over the selected aperture than the coherent light that was actually scattered by or transmitted through the desired scene, one expects the above-described interference pattern between the two light beams will have an intensity pattern, IP(x), at point "x" of approximately the form:

$$IP(x)=[1-\alpha[A_1(x)/A_R]\cos[\phi_1(x)-\phi_R(x)]].$$

Here, $A_1(x)$ and $\phi_1(x)$ are the respective relative amplitude and phase for the coherent light beam scattered by or transmitted through the desired scene, $A_R$ and $\phi_R(x)$ are the respective amplitude, i.e., assumed constant, and phase for the reference coherent light beam, and $\alpha$ is an efficiency of the CCD. Based on the measured values of $A_1(x)$ and IP(x) and the know values of $\phi_R(x)$, one can be numerically solve the above equation for IP(x) to extract there from the pixel-by-pixel map for the relative phase, $\phi_1(x)$, of the coherent light beam scattered by or transmitted through the desired scene over the preselected aperture.

Finally, other techniques and other algorithms for constructing a pixel-by-pixel map over a preselected aperture of the relative phases and relative amplitudes of a coherent light beam that was scattered by or transmitted through the desired scene may be described in one or more of "Diffraction-Specific Fringe Computation for Electro-Holography", Ph.D. Thesis of Mark Lucente in the Department of Electrical Engineering and Computer Science, Massachusetts Institute of Technology, September 1994; U.S. Pat. Nos. 6,211,848; 4,834,476; 4,986,619; and 5,172,251. The above-listed thesis and U.S. patents are incorporated herein by reference in their entirety.

From the disclosure, drawings, and claims, other embodiments of the invention will be apparent to those skilled in the art.

What is claimed is:

1. A method for producing 3D images, comprising:
   providing a pixel-by-pixel map over a preselected aperture of relative phases for coherent light scattered by a desired scene or transmitted through the desired scene;
   translating independently translatable micro-mirrors of a reconfigurable mirror array such that the micro-mirrors are positioned with respect to a reference plane to produce reflected light whose wave front has the pixel-by-pixel map over the preselected aperture in response to the array being illuminated with a coherent visible light beam; and
   illuminating the reconfigurable mirror array with the coherent visible light beam to produce a 3D image of the desired scene with the reflected light; and
   wherein an effective lateral linear dimension of the micro-mirrors is smaller than five times a wavelength of the light of the visible light beam.

2. The method of claim 1, wherein an effective lateral linear dimension of the micro-mirrors is smaller than about two times a wavelength of the light of the beam.

3. The method of claim 1, wherein a largest effective lateral linear dimension of each micro-mirror is smaller than about ten times a wavelength of the light of the beam.

4. The method of claim 1, wherein a largest lateral linear dimension of each micro-mirror is smaller than about five times a wavelength of the light of the beam.

5. The method of claim 1, wherein a largest lateral linear dimension of each micro-mirror is smaller than about two times a wavelength of the light of the beam.

6. The method of claim 1, wherein the positioning includes translating the micro-mirrors perpendicular to an average surface of the array.

7. The method of claim 1, wherein the pixel-by-pixel map provides relative intensities for the coherent light scattered by a desired scene or transmitted through the desired scene.

8. The method of claim 7, wherein a largest effective lateral linear dimension of each micro-mirror is smaller than about ten times a wavelength of the light of the beam.

9. The method of claim 7, wherein a largest effective lateral linear dimension of each micro-mirror is smaller than about five times a wavelength of the light of the beam.

10. The method of claim 7, wherein a largest effective lateral linear dimension of each micro-mirror is smaller than about two times a wavelength of the light of the beam.

11. The method of claim 7, further comprising repeating the providing, positioning, and illuminating steps to enable producing a different 3D image with the same array.

12. The method of claim 7, wherein the positioning includes displacing some of the micro-mirrors in a direction substantially normal to an average surface of the array.

13. An apparatus, comprising:
    a source of coherent visible light having a selected visible wavelength;
    a reconfigurable mirror array being located to be illuminated by the source, the array including a plurality of movable micro-mirrors, each micro-mirror capable of being independently translated with respect to a selected reference plane; and
    wherein the largest effective lateral linear dimension of each micro-mirror is smaller than five times the visible wavelength.

14. The apparatus of claim 13, wherein the largest effective lateral linear dimension of each micro-mirror is smaller than two times the wavelength.

15. The apparatus of claim 13, further comprising:
    a plurality of MEMS actuators, each MEMS actuator configured to translate a corresponding one of the micro-mirrors substantially normal to the surface of the array.

16. The apparatus of claim 15, further comprising a processor configured to cause the MEMS actuators to reposition the micro-mirrors in response to receiving a pixel-by-pixel map of the intensity and phase of a coherent light beam over an aperture.

* * * * *

UNITED STATES PATENT AND TRADEMARK OFFICE
CERTIFICATE OF CORRECTION

PATENT NO. : 7,619,808 B2 Page 1 of 1
APPLICATION NO. : 11/448390
DATED : November 17, 2009
INVENTOR(S) : Girsh Blumberg It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 464 days.

Signed and Sealed this

Fourteenth Day of December, 2010

David J. Kappos
*Director of the United States Patent and Trademark Office*